Nov. 2, 1965     V. E. HAMILTON     3,215,054
METHOD AND APPARATUS FOR PRODUCING AMBIENT
LIGHT TRAPPING FILTERS

Filed Oct. 3, 1962     2 Sheets-Sheet 1

INVENTOR
VERN E. HAMILTON

By Edwin Coates
ATTORNEY

Nov. 2, 1965  V. E. HAMILTON  3,215,054
METHOD AND APPARATUS FOR PRODUCING AMBIENT
LIGHT TRAPPING FILTERS
Filed Oct. 3, 1962  2 Sheets-Sheet 2

INVENTOR
VERN E. HAMILTON
BY Edwin Coates
ATTORNEY

United States Patent Office 3,215,054
Patented Nov. 2, 1965

3,215,054
METHOD AND APPARATUS FOR PRODUCING AMBIENT LIGHT TRAPPING FILTERS
Vern E. Hamilton, Palos Verdes Estates, Calif., assignor to Douglas Aircraft Company, Inc., Santa Monica, Calif.
Filed Oct. 3, 1962, Ser. No. 228,132
5 Claims. (Cl. 95—75)

This invention relates to the art of light ray filters of the type which trap ambient light rays angularly directed toward diffuse radiant screens presenting reproduced images, and more particularly to methods and apparatus for producing such filters.

Cathode ray tubes are ttypical examples of diffuse radiant screens and are particularly susceptible to the effects of ambient light rays. When such rays strike the surface of a cathode ray tube at various angles they produce specular reflection off the glass or diffuse reflection off the phosphors or both. The more serious problem is the reflection off the phosphors because such reflection often illuminates the low lights to such extent as to confuse them with the highlights, thus degrading the contrast.

Various schemes have been proposed for overcoming this difficulty, such as hoods over the tubes and honeycomb cores located in front of the "screens," but such schemes have met with only minor success. My copending application for patent on Ambient Light Filter, Serial No. 138,855, filed September 18, 1961, discloses a novel construction which solves the problem.

Briefly, that novel construction comprises a filter body of transparent material in which are embedded a plurality of filter elements having a grid pattern. Each element constitutes a tier of alternating transparent and highly light absorbing material in closely spaced relation to constitute a multiplicity of light transmitting apertures bordered by such light absorbing material. The grid pattern may be formed of generally parallel straight or wavy lines, or lines crossing each other to produce cells of varying shapes including but not limited to squares, rectangles, and diamonds. The tiers are in generally parallel relation to each other and are spaced depthwise of the filter body with the light transmitting apertures in registry to constitute depthwise directed viewing cells. The axes of the cells may be normal to the plane of the filter body or at some other preselected angle, and may be parallel or divergent within limits.

Ambient light rays striking the surface of the filter body at acute angles other than normal are refracted into the cells at an angle, striking one or another of the depthwise spaced lines of light absorbing material and are absorbed thereby. The success of such filter results from the fact that the cells are very small in at least one lateral dimension and the lines forming the cell boundaries are extremely thin in the depthwise direction so that their edges present no appreciable grazing surface to reflect light rays onwardly. In fact, in a typical example the width of the apertures may be from .015 to .020 inch and the line width from .002 to .004 inch. The line thickness may vary from .001 to .002 inch, or even thinner, and the depthwise spacing between lines may be of the order of .010 inch or less. Such a filter with six filter elements is only one sixteenth inch thick.

It will be readily appreciated that the manufacture of a filter of this type presents a very difficult problem, particularly with respect to the registry of the apertures in the several tiers. The separate layers bearing the filter elements, as disclosed in the prior application, must be very finely adjusted and then held in adjusted position until they are firmly cemented. This involves, among other things, precise apparatus for checking the registry.

These problems are greatly simplified by the use of the present invention which is intended primarily for high speed production of such filters having collimated viewing cells directed substantially normal to the plane of the filter. However, by suitable modifications the apparatus can be used to produce viewing cells in other than collimated arrangement. In addition, the nature of the present invention is such that all dimensions are scaled down greatly so that the total thickness of hte working portion of the filter is approximately .002 to .003 inch rather than the aforementioned one sixteenth inch.

The filter body used in the practice of the invention preferably consists of a laminate of transparent material applied to a base layer in the form of a transparent plastic sheet. One material suitable for this layer is cellulose acetate. Other materials having suitable transparency and flexibility may be substituted. The laminate consists of alternating layers of photo-sensitive and non-photo-sensitive material. The photo-sensitive layers are extremely thin, preferably of the order of two microns. The thickness of the non-photo-sensitive layers is of the order of ten microns or more. At present the laminate is formed in situ by applying a first coating of sensitized gelatin emulsion to the base layer, using a roller or squeegee. A second layer of unsensitized gelatin emulsion is then applied in the same way and the process is repeated until the desired number of layers have been formed, the outermost layer being an unsensitized one to protect the grid markings formed in the final sensitized layer.

The apparatus used in the practice of the invention includes a point light source, an opaque light shield having an elongate slot or light passage therethrough and a mask having alternating opaque and transparent portions in the form of the grid pattern which it is desired to produce in the sensitized laminae of the filter body. In the presently preferred embodiment, the mask is in the form of a hollow cylinder of suitable material such as a substantially rigid plastic. The desired grid markings may be printed on its outer surface by any means or a transparent film bearing such markings may be secured to its outer surface. The mask is mounted for rotation around its longitudinal axis on a suitable support. A high intensity point light source is located within the mask and, for normal usage, substantially on its longitudinal axis at its geometric center. An opaque light shield surrounds the light source and is provided with an elongate slot or light passage parallel to the longitudinal axis of the mask and contiguous to the mask wall. While the shield may have a variety of shapes it is preferably in the form of a cylinder slightly smaller than the mask and substantially concentric therewith.

A pair of guide and drive rollers are also mounted for rotation on the support with their axes parallel to that of the mask and located peripherally fore and aft of the light passage in the shield. They are spaced from the mask just sufficiently to grip the filter body sheet and hold it against the face of the mask as the mask and rollers rotate in unison. The sheet is thus held snugly and immovably against the mask as both move conjointly past the light passage. The rollers may be adjustably mounted to properly engage filter body sheets of different thicknesses.

Since the rays from the light source fan out radially they issue from the light passage in a thin wedge form whose general plane is substantially normal to the direction of travel of the mask and sheet. In the case where the grid markings on the mask are solely lines running parallel to the longitudinal axis thereof and hence laterally of the direction of travel of the sheet no consideration need be given to the lateral spread of the rays. Considering the spread in the direction of travel of the material, all the rays will pass through the sheet on lines radial to the point light source and normal to the curvature of the sheet at the particular point. Therefore the latent image of each successive line proceeding radially outward through the laminate will be slightly wider, the rate of increase being proportional to the radius of curvature of the sheet as it is firmly held on the cylindrical mask.

When the sheet leaves the mask and rollers, it passes through conventional development and fixing equipment and is then laid out flat or planar. The laminations which were stretched longitudinally as they passed over the mask now return to their original dimensions and the lines which were formed therein are correspondingly reduced in width. It will thus be seen that in the finished article in planar form the lines in the several laminae will all be of substantially the same width and will be fully collimated.

In the case where the grid markings on the mask include longitudinally extending lines or lines extending in any direction other than exactly laterally, a cylindrical lens is placed between the light source and the light passage, preferably close to the latter and is so selected and arranged as to collimate the laterally fanned out rays in the general plane passing through the light passage and including the light source. This arrangement provides full collimation of the lines and of the viewing cells in planes normal to the plane of the sheet and extending laterally of its longitudinal axis, and the process described above provides full collimation of the lines and cells in planes normal to the plane of the sheet and extending longitudinally thereof.

The primary purpose of the present method and apparatus is to produce filter bodies having depthwise spaced filter elements in which the grid patterns are fully collimated. However, it will be apparent selection of different lens curvatures or variations of the distance between the lens and the light source can be used to produce a desired degree of over-collimation or under-collimation. Also, by use of an anamorphic lens differential variation between the longitudinal and lateral axes may be obtained.

Various other advantages and features of novelty will be pointed out or become apparent in the course of the detailed description of the invention in conjunction with the attached drawing, in which.

Figure 1:
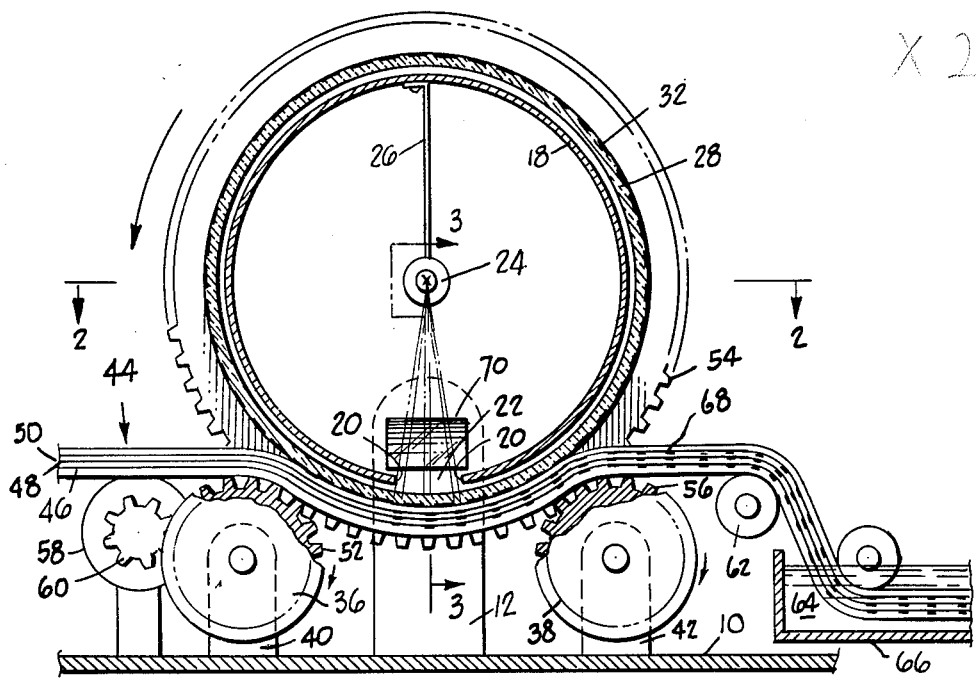
FIGURE 1 is an elevational view, partly in section showing a presently preferred form of apparatus in accordance with the invention.
Figure 2:
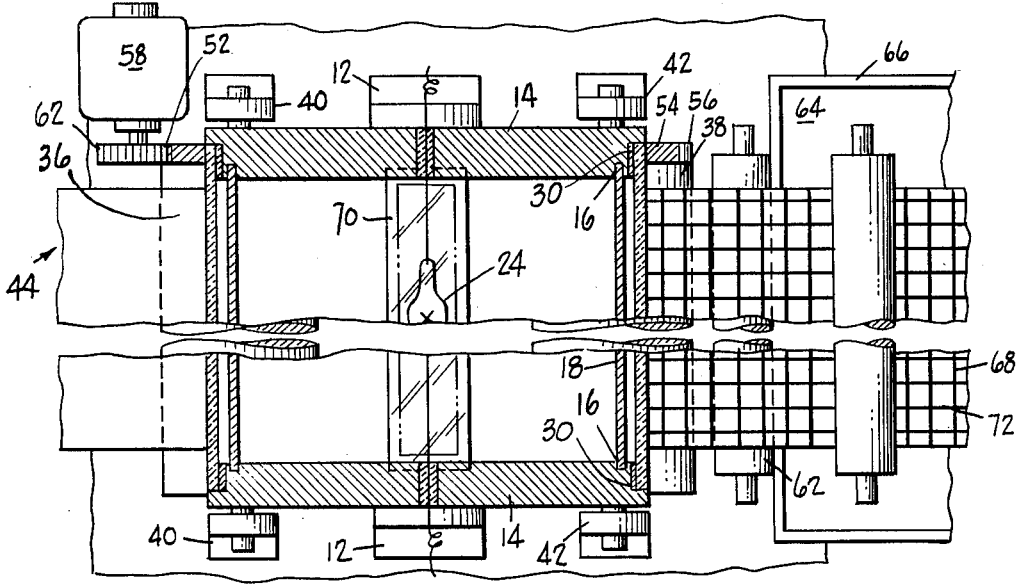
FIGURE 2 is a plan view, partly in section taken on line 2—2 of FIGURE 1, of the apparatus.

Referring now to the drawing in detail, the apparatus illustrated in FIGURE 1 includes a base or platform 10 on which is mounted a pair of spaced upstanding supports or brackets 12. Each of these brackets carries a combined support and end plate 14 which, in the present embodiment, is substantially circular. The inner walls of the end plates, near their peripheries, are provided with annular grooves 16, best seen in FIGURE 2, to receive the ends of a substantially cylindrical opaque light shield 18. The free edges 20 of the shield are spaced apart to form a slot or light passage 22 parallel to the longitudinal axis of the cylinder.

A highly intensity point light source, such as lamp 24, is mounted by means of brackets 26 substantially on the longitudinal axis of the shield and at the geometric center thereof. Light rays from this source spread out in all directions and those which strike the walls of the shield or end plates are absorbed by suitable black light absorbing material coated or mounted on these surfaces. The remaining rays pass through the light passage 22 and extend therebeyond in a wedge-shaped band of light.

A mask 28 surrounds the light shield. This mask may be formed in various ways but preferably is a cylinder of rigid transparent material such as a rigid plastic of any suitable kind, although it can if desired be made of glass. The cylinder is slightly larger than the shield and surrounds it, being mounted for rotation about its own longitudinal axis which desirably coincides with that of the shield. It may be mounted in any way and, as shown, rotates on bearings 30 carried by end plates 14. The mask is provided with the negative form of grid markings 32 and 34 consisting of peripheral and lateral opaque lines. These patterns may be printed on the outer surface of the cylinder or formed thereon photographically, or a thin film bearing such markings may preferably but not necessarily be secured to the surface.

Figure 5:
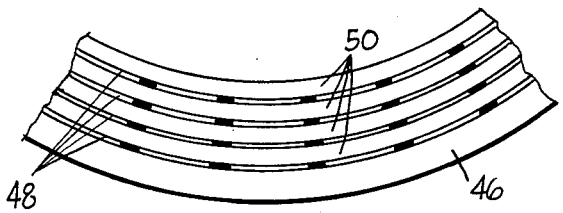
FIGURE 5 is a greatly enlarged edge view of an idealized representation of the laminated sheet material used in the practice of the invention.

Guide and drive rollers 36 and 38 are mounted for rotation on brackets 40 and 42 and are so spaced with respect to the outer surface of mask 28 as to provide exactly the proper gap for the passage of sheet 44. The latter is a continuous strip of material from which a large number of identical completed filters can be cut, and as seen in FIGURE 5, consists in its presently preferred form of a base layer 46 of a suitable transparent flexible plastic material such as cellulose acetate on which are deposited in alternating order layers 48 and 50 of photo-sensitive and non-photo-sensitive gelatin emulsion to the desired number of each, finishing with a non-sensitized layer to protect the final sensitized layer which will bear grid markings in its finished form. The layers are shown in extremely exaggerated scale in FIGURE 5 so that the various elements can be distinguished. Layers 48 are actually about two microns thick and layers 50 are about ten microns thick. The layers are homogeneous and there is no visible parting line between them.

The sheet is gripped tightly between the rollers and the mask so that it will be held snugly against the surface of the mask as it passes through the wedge of light issuing through light passage 22. Brackets 40 and 42 may be made adjustable or spring loaded by any conventional means, not shown, to accommodate sheets of different thicknesses. While the mask may be driven and the rollers operate as idlers it is preferable to gear them together so that they are all driven positively to insure no slippage of the sheet with respect to the mask. To this end, roller 36 carries gear 52 which meshes with gear 54 on the mask. Gear 54 in turn meshes with gear 56 carried by roller 38. Motor 58 carries a gear 60 which meshes with gear 52 to drive both rollers and mask in unison. After leaving roller 38 the sheet passes over idler roller 62 and into developing bath 64 contained in tank 66. Conventional developing and fixing equipment and processes may be used to produce the finished product.

To prepare for operation, the leading end of sheet 44 is threaded between the mask and rollers 36 and 38 and then advanced over roller 62 into the developing bath. Light source 24 is turned on and motor 58 is activated. The sheet now moves through the zone of the wedge of light conjointly with the mask and in non-slipping contact therewith. Since the light source is at the center of curvature of the sheet and mask, all of the rays pass radially through the sheet in those areas not blocked by the opaque lines 32 of the mask. These areas are exposed and latent images of lines, represented by reference character 68, are formed in the sensitized laminae. Since the rays are radial each successive line proceeding outward from the mask is slightly wider, in proportion to its radial displacement, so that at this point the lines are not collimated. However, the laminae have been correspondingly stretched to accommodate the curvature and when the sheet is again flattened, the latent images of the lines will be the same width, and they and the viewing cells between them will be fully collimated. This relation is retained in the finished article.

Figure 3:
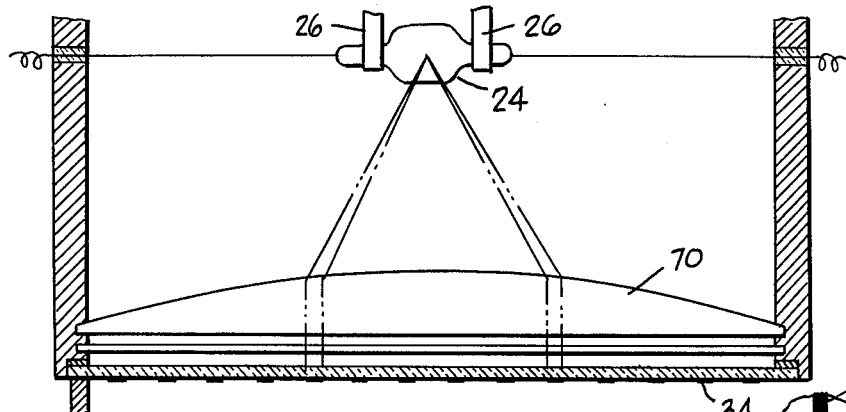
FIGURE 3 is a sectional view of a part of the apparatus taken on line 3—3 of FIGURE 1.
Figure 4A:
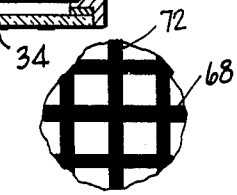
FIGURE 4A is an enlarged detail view in plan of a portion of the sheet of FIGURE 4 encircled by arrows 4A.
Figure 4:
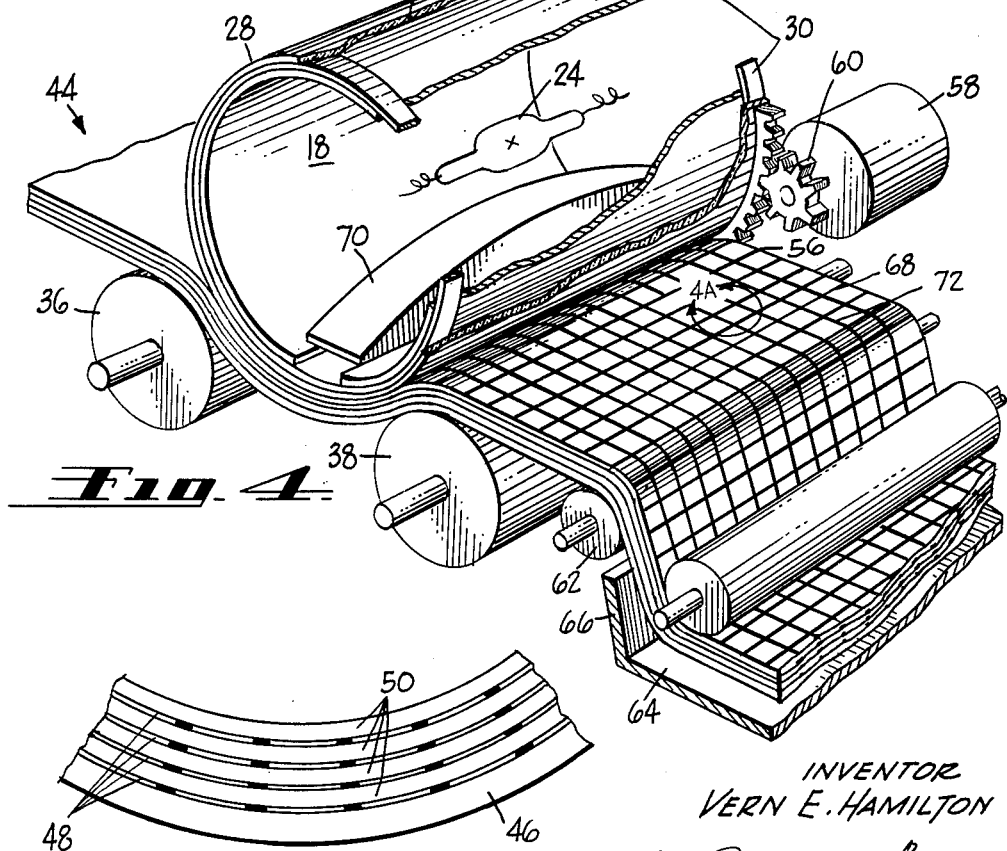
FIGURE 4 is a perspective view showing an idealized representation of the apparatus in action.

If it is desired to form grid patterns having longitudinal lines corresponding to lines 34 on the mask or any pattern in which the lines are not entirely lateral and it is desired that the finished product be fully collimated, then it is necessary to collimate the light rays in radial planes passing through the light source. This is accomplished by providing an anamorphic lens such as the cylindrical lens 70 as best seen in FIGURES 1 and 3. It can be seen in FIGURE 3 that rays fanning outwardly from the light source 24, upon striking the curved surface of the lens are refracted sufficiently to make them parallel in the radial plane, or the plane transverse to the direction of travel of the sheet. The latent images of the lines 72 produced by these rays in the various laminae will be of constant width and parallel across the width of the sheet and will remain so during the subsequent processing to produce the finished product. The general relation of lines and spaces is illustrated in FIGURE 4A.

The viewing cells can be made to converge or diverge across the width of the sheet by suitably varying the curvature of the cylindrical lens or by changing its distance from the light source. It is also possible to produce convergence or divergence of the viewing cells in the longitudinal direction by moving the light source radially closer to or farther from the mask and sheet, or, by use of an anamorphic lens having different powers in the longitudinal and lateral directions.

The speed of production with a given light intensity and film speed is a function of the peripheral width of the light band. Since the time of exposure is fixed, the longer the travel the faster the rate of travel can be. Although the actual peripheral width of the light passage and light band can even exceed one hundred eighty degrees, with rollers 36 and 38 properly relocated, it has not been found to be necessary to go even as far as ninety degrees because the speed of travel is limited by the problems of developing and processing the exposed laminate.

The preferred form of the light shield, as shown, is cylindrical but it may take any shape so long as it prevents the light rays from reaching the sheet at any point where it is not in close contact with the mask so that exposure will be limited to the proper parts of the laminate. The shield need not completely enclose the light source although this is the preferred arrangement.

It will be apparent to those skilled in the art that various other changes and modifications may be made in the construction and arrangement of parts without departing from the spirit of the invention, and it is intended that all such changes and modifications shall be embraced within the scope of the following claims.

I claim:

1. Apparatus for producing simultaneously a plurality of substantially parallel depthwise spaced light trapping filter elements of grid form in a transparent sheet having alternating laminae of photo-sensitive and non-photosensitive material, the grid patterns of said elements being in predetermined registry, comprising: a pair of laterally spaced, fixed supports; an opaque light shield of generally cylindrical form extending between and mounted on said supports with its longitudinal axis extending laterally between said supports; an elongate light passage formed in the wall of said shield with its longitudinal axis parallel to the longitudinal axis of said shield; a point type light source mounted within said light shield substantially at its geometric center; a cylindrical mask surrounding said light shield substantially concentric therewith and mounted for rotation on said supports; said mask having alternating opaque and transparent portions arranged in a grid pattern; a pair of rollers mounted in proximity to said mask fore and aft of the light passage in the direction of travel of said mask and arranged to hold said sheet in close contact with said mask for conjoint travel past said light passage to cause successive portions of said sheet to be exposed to rays from said light source passing through said light passage and the transparent portions of said mask; and means to drive said mask and said rollers.

2. Apparatus for producing simultaneously a plurality of substantially parallel depthwise spaced light trapping filter elements of grid form in a transparent sheet having alternating laminae of photo-sensitive and non-photosensitive material, the grid patterns of said elements being in predetermined registry, comprising: an opaque light shield having an elongate light passage therethrough; a point type light source spaced from one side of said light shield; a cylindrical mask surrounding said light shield and said light source and mounted for rotation about its own axis, which axis is parallel to the longitudinal axis of said light passage and substantially coincident with said light source; said mask having alternating opaque and transparent portions arranged in a grid pattern; roller means adjacent to said mask to hold said sheet in close, driven contact with said mask throughout a peripheral distance at least equal to the width of the band of light issuing through said light passage in the direction of travel of said mask; and drive means to rotate said mask and cause successive portions of said mask and sheet to conjointly pass said light passage whereby successive portions of said sheet will be momentarily exposed to depthwise directed light rays passing through said light passage and the transparent portions of said mask.

3. Apparatus for producing simultaneously a plurality of substantially parallel depthwise spaced light trapping filter elements of grid form in a transparent sheet having alternating laminae of photo-sensitive and non-photosensitive material, the grid patterns of said elements being in predetermined registry, comprising: an opaque light shield having an elongate light passage therethrough; a point-type light source spaced from one side of said shield; a mask at the opposite side of said shield movable past said light passage in an arcuate path substantially centered on said light source and in a direction normal to the longitudinal axis of said passage; said mask having alternating opaque and transparent portions arranged in a grid pattern; roller means fore and aft of said light passage in juxtaposition to said mask and serving to hold said sheet in close, driven contact with said mask; and means to move said mask and said sheet past said passage in said arcuate path in close contact with each other and with the mask between the light source and the sheet to momentarily subject portions of said photo-sensitive laminae to depthwise directed light rays from said source passing through the transparent portions of said mask.

4. Apparatus for producing simultaneously a plurality of substantially parallel depthwise spaced light trapping filter elements of grid form in a transparent sheet having alternating laminae of photo-sensitive and non-photo-sensitive material; the grid patterns of said elements being in predetermined registry, comprising: an opaque light shield having an elongate light passage therethrough; a point-type light source spaced from one side of said shield; a narrow elongate collimating lens on the same side of the light shield directly overlying said light passage and being of substantially the same longitudinal and lateral dimensions as said light passage; a mask at the opposite side of said shield movable past said light passage in an arcuate path and in a direction normal to the longitudinal axis of said passage; said mask having alternating opaque and transparent portions arranged in a grid pattern; and means to move said mask and said sheet past said passage in said arcuate path in close contact with each other and with the mask between the light source and the sheet to momentarily subject portions of said photo-sensitive laminae to depthwise directed light rays from said source passing through the transparent portions of said mask.

5. Apparatus for producing simultaneously a plurality of substantially parallel depthwise spaced light trapping filter elements of grid form in a transparent sheet having alternating laminae of photo-sensitive and non-photo-sensitive material, the grid patterns of said elements being in predetermined registry, comprising: support means; an opaque light shield stationarily mounted on said support means; a narrow elongate light passage formed in a wall of said shield with its longitudinal axis extending laterally of the path of travel of said sheet; a point type light source mounted within said light shield; bearing means formed on said light shield; a cylindrical mask mounted for rotation on said bearing means about an axis parallel to the axis of said light passage, one surface of said mask passing in proximity to said light passage; said mask having alternating opaque and transparent portions arranged in a grid pattern; means located in proximity to said mask and said light passage to hold said sheet in close, driven contact with said mask for conjoint travel past said light passage to cause successive portions of said sheet to be exposed to rays from said light source passing through said light passage and the transparent portions of said mask; and drive means positively connected to said mask to cause rotation thereof.

References Cited by the Examiner
UNITED STATES PATENTS

| | | | |
|---|---|---|---|
| 2,095,015 | 10/37 | Von Kujawa | 96—116 |
| 2,123,276 | 7/38 | Eckerlin | 96—116 |
| 2,732,778 | 1/56 | Limberger | 95—77.5 |
| 2,991,705 | 7/61 | Bryan et al. | 95—77.5 |
| 3,003,404 | 10/61 | Metcalf et al. | 95—1.7 |
| 3,037,419 | 6/62 | Nixon | 88—1 |
| 3,107,595 | 10/63 | Pike | 99—77.5 |

EVON C. BLUNK, *Primary Examiner.*